US011887772B2

(12) United States Patent
Arai et al.

(10) Patent No.: US 11,887,772 B2
(45) Date of Patent: Jan. 30, 2024

(54) SURFACE MOUNT INDUCTOR

(71) Applicant: Murata Manufacturing Co., Ltd., Kyoto-fu (JP)

(72) Inventors: Takumi Arai, Nagaokakyo (JP); Ryuta Uematsu, Nagaokakyo (JP); Koichi Saito, Nagaokakyo (JP); Kazuhide Kudo, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1015 days.

(21) Appl. No.: 16/289,192

(22) Filed: Feb. 28, 2019

(65) Prior Publication Data

US 2019/0272945 A1 Sep. 5, 2019

(30) Foreign Application Priority Data

Mar. 1, 2018 (JP) ................................. 2018-036874

(51) Int. Cl.
*H01F 27/29* (2006.01)
*H01F 27/24* (2006.01)
(Continued)

(52) U.S. Cl.
CPC ........... *H01F 27/292* (2013.01); *H01F 17/06* (2013.01); *H01F 27/24* (2013.01); *H01F 27/28* (2013.01);
(Continued)

(58) Field of Classification Search
CPC .. H01F 27/29; H01F 27/292; H01F 2017/048; H01F 17/04; H01F 27/24; H01F 27/28; H01F 27/2847; H01F 17/06
(Continued)

(56) References Cited

U.S. PATENT DOCUMENTS

2004/0145442 A1* 7/2004 Matsutani ............... H01F 21/12
336/200
2010/0253463 A1 10/2010 Shimomura et al.
(Continued)

FOREIGN PATENT DOCUMENTS

CN 1692457 A 11/2005
CN 101896982 A 11/2010
(Continued)

OTHER PUBLICATIONS

An Office Action mailed by China National Intellectual Property Administration dated Jan. 5, 2021, which corresponds to Chinese Patent Application No. 201910141511.8 and is related to U.S. Appl. No. 16/289,192 with English language translation.
(Continued)

*Primary Examiner* — Tszfung J Chan
(74) *Attorney, Agent, or Firm* — Studebaker & Brackett PC

(57) ABSTRACT

A surface mount inductor includes a molded body made of a composite material containing magnetic powder, and a metal plate including a first metal plate portion embedded in the molded body and a second metal plate portion extending from the first metal plate portion to an outside of the molded body. The second metal plate portion is extended from a side surface or mounting surface side of the molded body, is arranged along the molded body with a bent portion, and forms an external terminal arranged at least on the mounting surface side of the molded body. The external terminal includes a plating layer on a surface on an opposite side from a surface facing the molded body, and does not include a plating layer on the surface facing the molded body.

20 Claims, 5 Drawing Sheets

(51) Int. Cl.
*H01F 27/28* (2006.01)
*H01F 17/06* (2006.01)
*H01F 17/04* (2006.01)

(52) U.S. Cl.
CPC ... *H01F 27/2847* (2013.01); *H01F 2017/048* (2013.01)

(58) Field of Classification Search
USPC .......................................... 336/83, 200, 232
See application file for complete search history.

(56) References Cited

U.S. PATENT DOCUMENTS

| | | | | |
|---|---|---|---|---|
| 2014/0313003 A1* | 10/2014 | Liu | ....................... | H01F 17/043 336/178 |
| 2017/0229232 A1 | 8/2017 | Takagi et al. | | |

FOREIGN PATENT DOCUMENTS

| | | | | | | |
|---|---|---|---|---|---|---|
| JP | H05-29122 | A | | 2/1993 | | |
| JP | 2000-040623 | A | | 2/2000 | | |
| JP | 2004-221458 | A | | 8/2004 | | |
| JP | 2006120887 | A | * | 5/2006 | ............. | H01F 17/06 |
| JP | 2013-120919 | A | | 6/2013 | | |
| JP | 2013120919 | A | * | 6/2013 | | |
| JP | 2016-134590 | A | | 7/2016 | | |
| JP | 2016-225480 | A | | 12/2016 | | |
| JP | 2017-510072 | A | | 4/2017 | | |
| JP | 2017-139379 | A | | 8/2017 | | |
| WO | 2004/055841 | A1 | | 7/2004 | | |
| WO | WO-2006070544 | A1 | * | 7/2006 | ............. | H01F 17/06 |
| WO | 2009/075110 | A1 | | 6/2009 | | |

OTHER PUBLICATIONS

An Office Action; "Notice of Reasons for Refusal," mailed by the Japanese Patent Office dated Sep. 23, 2020, which corresponds to Japanese Patent Application No. 2018-036874 and is related to U.S. Appl. No. 16/289,192 with English language translation.
An Office Action; "Notification of Reasons for Refusal," mailed by the Japanese Patent Office dated Jun. 30, 2020, which corresponds to Japanese Patent Application No. 2018-036874 and is related to U.S. Appl. No. 16/289,192 with English language translation.

* cited by examiner

SURFACE MOUNT INDUCTOR

CROSS-REFERENCE TO RELATED APPLICATION

This application claims benefit of priority to Japanese Patent Application No. 2018-036874, filed Mar. 1, 2018, the entire content of which is incorporated herein by reference.

BACKGROUND

Technical Field

The present disclosure relates to a surface mount inductor.

Background Art

An inductance component in which a coil conductor made of a metal conductor is contained in a magnetic body portion obtained by pressure-molding a mixture of metal magnetic powder and a binding material, and a terminal is formed by bending the metal conductor is used for various electronic devices as described, for example, in International Publication No. 2009/075110. In addition, a chip-type electronic component is known in which an element body to which a lead terminal is fixed is covered with an insulating outer package body and the lead terminals led out from the outer package body are bent, and it is said that a crack can be prevented from occurring in the outer package body at the time of bending as described, for example, in Japanese Unexamined Utility Model Registration Application Publication No. 5-29122. Further, a coil component is known in which a lead led out from an outer package body is bent to form an external terminal in the same manner as described, for example, in Japanese Unexamined Patent Application Publication No. 2016-134590, Japanese Unexamined Patent Application Publication No. 2000-40623, and International Publication No. 2004/055841.

In a conventional electronic component in which a lead led out from a molded body is bent to form an external terminal, the lead portion is plated in order to improve wettability for solder. In the external terminal formed by bending the lead to which the plating is applied, a plating layer comes into contact with the molded body. In this case, when the electronic component is soldered to a mounting substrate, the solder is absorbed between the molded body and the external terminal, an unnecessary load is applied to the external terminal, and thus, there is a case in which reliability is lowered. Further, there is a case where the characteristics of the electronic component, such as a Q value and the like, deteriorate due to the solder being in contact with the molded body.

SUMMARY

The present disclosure provides a surface mount inductor capable of suppressing deterioration in characteristics at the time of mounting.

A surface mount inductor according to preferred embodiments of the present disclosure includes a molded body made of a composite material containing magnetic powder, and a metal plate including a first metal plate portion embedded in the molded body and a second metal plate portion extending from the first metal plate portion to an outside of the molded body. The second metal plate portion is extended from a side surface or mounting surface side of the molded body, is arranged along the molded body with a bent portion, and forms an external terminal arranged at least on the mounting surface side of the molded body. The external terminal includes a plating layer on a surface on an opposite side from a surface facing the molded body, and does not include a plating layer on the surface facing the molded body.

According to the present disclosure, it is possible to provide a surface mount inductor capable of suppressing deterioration in characteristics at the time of mounting.

Other features, elements, characteristics and advantages of the present disclosure will become more apparent from the following detailed description of preferred embodiments of the present disclosure with reference to the attached drawings.

DETAILED DESCRIPTION

Figure 1A:
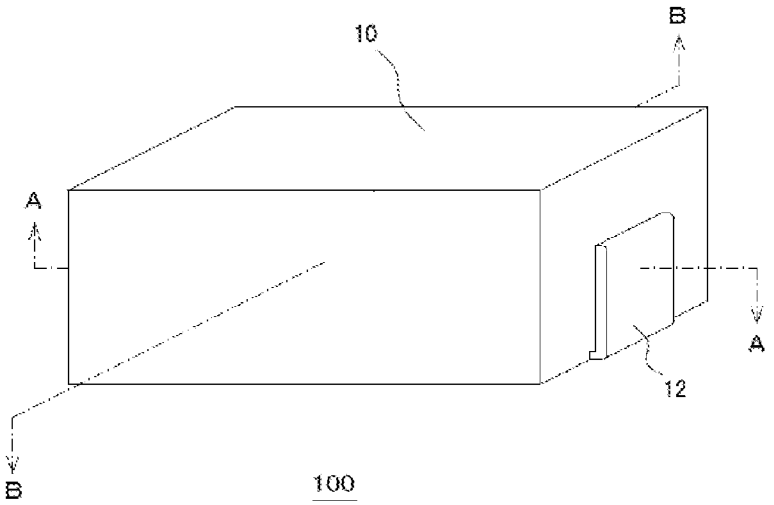
FIG. 1A is a perspective view illustrating an example of a surface mount inductor of a first embodiment.

A surface mount inductor includes a molded body made of a composite material containing magnetic powder and an external terminal formed of a metal plate embedded in the molded body and arranged at least on a mounting surface. The metal plate includes a first metal plate portion embedded in the molded body and a second metal plate portion extending from the first metal plate portion to the outside of the molded body. The second metal plate portion is extended from a side surface or mounting surface side of the molded body, is arranged along the molded body with a bent portion, and forms an external terminal arranged at least on the mounting surface side of the molded body. The external terminal includes a plating layer on a surface on an opposite side from a surface facing the molded body, and does not include a plating layer on the surface facing the molded body. Since the surface mount inductor includes the plating layer on the surface of the external terminal which arranged on the mounting surface has the opposite side from the surface facing the molded body, and thus a good solder wettability at the time of mounting is obtained and excellent reliability after mounting is achieved. Further, since the surface mount inductor does not include the plating layer on the surface of the external terminal facing the molded body, it is possible to suppress the solder from being absorbed between the molded body and the external terminal at the time of mounting. Therefore, in this surface mount inductor, an unnecessary stress load applied to the external terminal is suppressed, and thus, the reliability is improved. Further, in this surface mount inductor, decrease in a Q value due to contact of the solder with the molded body is suppressed.

The first metal plate portion may include a plating layer on a surface which is continuous with the surface of the external terminal including the plating layer. With this, since the surface mount inductor is formed of a single metal plate including the plating layer on one surface, productivity is improved. Further, since a plating process after formation of the molded body can be avoided, it is possible to suppress deterioration in characteristics due to adhesion of plating liquid to the molded body.

The molded body may include a recessed portion for housing the external terminal on the mounting surface side. With this, the fixing strength of the external terminal to the molded body is improved.

The second metal plate portion may be extended from the side surface of the molded body. With this, since a length of the first metal plate portion embedded in the molded body can be increased, a predetermined inductance can be easily obtained. In addition, a solder fillet is formed on the side surface of the surface mount inductor at the time of mounting, so that the reliability of the mounting is improved.

The second metal plate portion may be extended from the mounting surface side of the molded body. With this, since the external terminal is formed only on the mounting surface, the size can further be reduced. In addition, since the solder fillet is suppressed from being formed on the side surface of the surface mount inductor at the time of mounting, it is possible to achieve mounting at a higher density. Further, it is possible to further easily reduce the height of the surface mount inductor.

At least a part of a surface of the second metal plate portion facing the molded body may be embedded in the molded body. With this, the fixing strength of the external terminal to the molded body is improved.

The plating layer may include a nickel plating layer and a tin plating layer arranged on the nickel plating layer. With this, wettability to the external terminal of the solder is further improved, and mounting with higher reliability can be achieved.

Hereinafter, embodiments of the present disclosure will be described with reference to the drawings. Note that the embodiments described hereinafter are provided only to illustrate the surface mount inductor for embodying the technical concept of the present disclosure, and the present disclosure is not limited to the surface mount inductor described below. In addition, members indicated in the appended claims are not limited to members of the embodiments. In particular, the dimensions, materials, shapes, relative arrangements, and the like of the components described in the embodiments are unless otherwise specified merely examples for descriptive purposes, and the scope of the present disclosure is not intended to be limited only thereto. Note that the sizes, the positional relationship, and the like of the members illustrated in the drawings may be exaggerated to clarify the descriptions. In addition, in the following descriptions, the same names or same reference numerals indicate the same or similar members, and detailed descriptions thereof will be omitted as appropriate. Furthermore, in each of the elements constituting the present disclosure, a plurality of elements may be constituted using the same member so that one member serves as the plurality of elements, or conversely, a function of one member may be shared by a plurality of members. Furthermore, contents described in some embodiments may be utilized in other embodiments.

EMBODIMENTS

First Embodiment

Figure 1B:
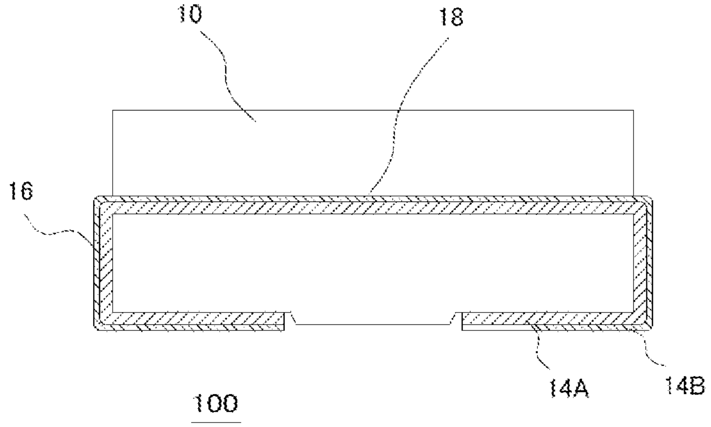
FIG. 1B is a cross-sectional view taken along a line A-A in FIG. 1A.
Figure 1C:
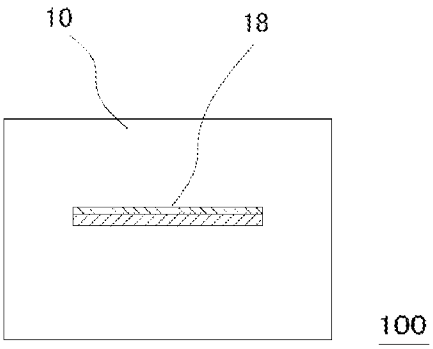
FIG. 1C is a cross-sectional view taken along a line B-B in FIG. 1A.

A surface mount inductor 100 according to a first embodiment will be described with reference to FIG. 1A to FIG. 1C. FIG. 1A is a schematic perspective view of the surface mount inductor 100 according to the first embodiment. FIG. 1B is a schematic cross-sectional view taken along a line A-A in FIG. 1A. FIG. 1C is a schematic cross-sectional view taken along a line B-B in FIG. 1A.

As illustrated in FIG. 1A, the surface mount inductor 100 according to the first embodiment includes a molded body 10 made of a composite material containing magnetic powder and an external terminal 12 formed of a metal plate embedded in the molded body 10. The molded body 10 has a bottom surface that is on a mounting surface side, an upper surface facing the bottom surface, and four side surfaces orthogonal to the bottom surface and the upper surface. Further, the molded body 10 has a lengthwise direction parallel to the line A-A direction and a widthwise direction parallel to the line B-B direction. The external terminal 12 is extended from the side surface orthogonal to the lengthwise direction of the molded body 10, is arranged along the side surface of the molded body 10 with a bent portion, and extends to the bottom surface. The composite material constituting the molded body 10 may contain a binder such as a resin or the like in addition to the magnetic powder. As the magnetic powder, for example, ferrite particles, or metal magnetic particles such as a metal magnetic material including iron, or an amorphous alloy, a nano crystal, or the like can be used. Further, as the binder, a thermosetting resin such as an epoxy resin or the like is used.

As illustrated in FIG. 1B, the surface mount inductor 100 includes the molded body 10, and a metal plate including a first metal plate portion 18 embedded in the molded body 10, and a second metal plate portion 16 extending from the first metal plate portion 18 to the outer side portion of the molded body 10. The metal plate has a substantially linear shape having the second metal plate portions 16 on both sides in an extending direction of the first metal plate portion 18, and has the extending direction, a width direction orthogonal to the extending direction in a planar direction, and a thickness orthogonal to the extending direction and the width direction. The metal plate penetrates the molded body 10, and both end portions thereof are respectively extended from the side surfaces of the molded body 10 in the lengthwise direction as the second metal plate portions 16. The first metal plate portion 18 is embedded in the molded body 10 to constitute a coil conductor portion. Each of the second metal plate portions 16 is extended from the side surface of the molded body 10, and is arranged along the side surface of the molded body 10 with two bent portions per one side, and extends to the bottom surface of the molded body 10 to form the external terminal. For example, the metal plate is constituted by including a plating layer 14B on one surface of a conductive metal base material 14A such as copper or the like. In the second metal plate portion 16, the metal base material 14A side of the metal plate is arranged in contact with the side surface and the bottom surface of the molded body 10, and the plating layer 14B is provided on a surface of the metal plate on an opposite side from the side of the molded body 10. With this, the plating layer 14B is provided on the surface of a portion of the external terminal arranged on the mounting surface side on the opposite side from the surface facing the molded body 10, the plating layer 14B is not present on the surface facing the molded body 10, and the metal base material 14A is in contact with the molded body 10. In addition, the plating layer 14B is also provided on a surface of the first metal plate portion 18 which is continuous with the surface of the second metal plate portion 16 on which the plating layer 14B is provided. A recessed portion is provided on the bottom surface of the molded body 10, which is the mounting surface side, and the external terminal is partially housed therein. In FIG. 1B, a surface of the external terminal on the mounting surface side protrudes from the bottom surface of the molded body 10.

As illustrated in FIG. 1C, in a cross section of the surface mount inductor 100 taken along the line B-B, the first metal plate portion 18 of the metal plate is embedded in the molded body 10 and constitutes the coil conductor portion. The first metal plate portion 18 is arranged such that surfaces orthogonal to the thickness direction thereof are substantially parallel to the bottom surface and the upper surface of the molded body 10, and side surfaces in the width direction are arranged apart from the side surfaces of the molded body 10, respectively. Further, the plating layer 14B is provided on the surface of the first metal plate portion 18 on the upper surface side of the molded body 10.

For example, the molded body 10 is formed in a so-called approximately 252010 size, which has a length being a length in the lengthwise direction is approximately 2.5 mm, a width being a length in the widthwise direction is approximately 2.0 mm, and a height being a distance between the bottom surface and the upper surface is approximately 1.0 mm. In addition, the metal plate is constituted of, for example, the metal base material 14A made of copper having a line width of approximately 600 μm and a thickness of approximately 150 μm, and the plating layer 14B formed on one entire surface of the metal base material 14A. The plating layer of the metal plate is formed, for example, by including nickel (Ni) plating as a first layer which is provided in contact with the metal base material 14A and tin (Sn) plating as a second layer which is provided on the first layer.

In the surface mount inductor 100, since the plating layer 14B is not present between the side surface and the bottom surface of the molded body 10 and the second metal plate portion 16 extended from the molded body 10, it is possible to suppress the solder from being absorbed between the external terminal and the molded body at the time of mounting. In addition, in the surface mount inductor 100, since the first metal plate portion 18 embedded in the molded body 10 has the plating layer 14B on one surface, the surface mount inductor can be constituted using the metal plate plated on the one surface in advance, and thus, excellent productivity is obtained. Further, it is not necessary to perform the plating process after the second metal plate portion 16 is bent to form the external terminal, and it is possible to prevent plating liquid from adhering to the molded body 10. Since the recessed portion is provided on the bottom surface of the molded body 10 and a tip end portion of the external terminal is housed therein, it is possible to improve the fixing strength of the external terminal.

This surface mount inductor 100 is manufactured, for example, using a manufacturing method that includes preparing the molded body 10 in which the metal plate of a substantially straight line shape having the flat portion is formed by exposing the second metal plate portions 16 which are the respective end portions of the metal plate and by the first metal plate portion 18 sandwiched between the second metal plate portions 16 being embedded with the flat portion of the metal plate parallel to the bottom surface and the upper surface, and forming the bent portion in each of the second metal plate portions 16 and arranging each of the second metal plate portions 16 along the side surface and the bottom surface of the molded body 10. The bent portion is formed with, for example, its interior angle of approximately 90°.

Second Embodiment

Figure 2A:
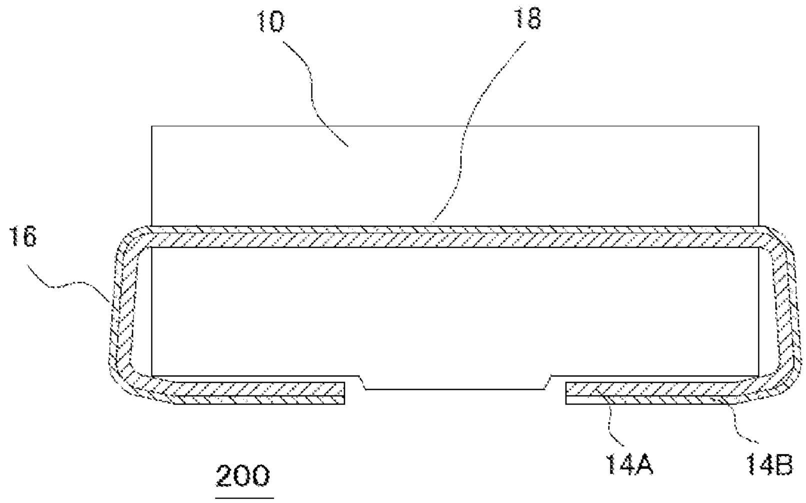
FIG. 2A is a cross-sectional view illustrating example of the surface mount inductor of second embodiment.
Figure 2B:
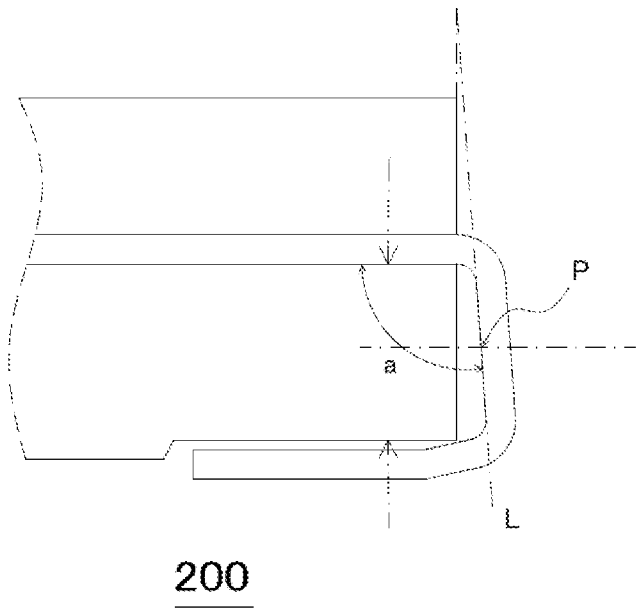
FIG. 2B is a partial enlarged view of FIG. 2A.

A surface mount inductor 200 according to a second embodiment will be described with reference to FIG. 2A and FIG. 2B. FIG. 2A is a schematic cross-sectional view of the surface mount inductor 200, corresponding to FIG. 1B. FIG. 2B is a partial enlarged view of FIG. 2A. In the surface mount inductor 200, an interior angle of the bent portion of the portion of the second metal plate portion 16 protruding from the molded body 10 is an obtuse angle, and at least a part of the second metal plate portion 16 is arranged with a gap along the side surface of the molded body 10.

As illustrated in FIG. 2A, the surface mount inductor 200 includes the molded body 10, and the metal plate including the first metal plate portion 18 embedded in the molded body 10 and the second metal plate portion 16 extending from the first metal plate portion 18 to the outside of the molded body. In the surface mount inductor 200, each of the second metal plate portions 16 is extended from the side surface of the molded body 10 in the lengthwise direction, and forms the external terminal by extending to the bottom surface along the side surface of the molded body 10 with two bent portions per one side. A first bent portion of the second metal plate portion 16 at the extended position from the molded body 10 is bent with the interior angle of an obtuse angle toward a direction of the mounting surface. Further, a second bent portion of the second metal plate portion 16 from a portion extending along the side surface of the molded body 10 toward a direction substantially parallel to the bottom surface of the molded body 10 is bent with an interior angle of an obtuse angle. A portion extending along the side surface of the molded body 10 of the second metal plate portion 16 has the gap between the side surface of the molded body 10 and the extending portion. In FIG. 2A, the portion of the second metal plate portion 16 extending along the side surface of the molded body 10 has a straight portion, but may form a continuous curve from the first bent portion to the second bent portion. A portion of the second metal plate portion 16 arranged on the bottom surface of the molded body 10 has a straight portion, and is partially housed in the recessed portion provided on the bottom surface of the molded body 10. In FIG. 2A, the portion of the second metal plate portion 16 arranged on the bottom surface of the molded body 10 partially has a gap between the portion and the surface of the recessed portion of the molded body 10.

The metal plate having the first metal plate portion 18 and the second metal plate portion 16 is constituted, for example, by including the plating layer 14B on one surface of the conductive metal base material 14A such as copper or the like. The plating layer 14B is arranged on the opposite side from the surface facing the molded body 10 in the second metal plate portion 16, and the surface of the metal base material 14A on which the plating layer is not provided faces the molded body 10.

The surface mount inductor 200 is manufactured, for example, by bending the second metal plate portion 16 after the formation of the molded body 10 in which the first metal plate portion 18 is embedded. As for the bending of the second metal plate portion 16, the second bent portion may be formed after the first bent portion is formed, or the first bent portion may be formed after the second bent portion is formed. By forming the second bent portion first, it is possible to further alleviate a stress to the molded body 10 when the first bent portion is formed.

In the surface mount inductor 200, since the first bent portion of the second metal plate portion 16 is bent with the obtuse angle, when the surface mount inductor 200 is manufactured, the stress applied to the molded body 10 is alleviated and damage to the molded body can be suppressed from occurring. In addition, in the surface mount inductor 200, since the length of the second metal plate portion 16 can be increased, when the second metal plate portion 16 is bent to form the external electrode, the stress applied to the molded body is alleviated and the damage to the molded body can be suppressed from occurring.

FIG. 2B is a partial enlarged cross-sectional view illustrating that the first bent portion has the obtuse interior angle. A bent angle of the first bent portion is defined as an interior angle "a" of the first bent portion. The interior angle "a" is, in a cross section that is parallel to the lengthwise direction and orthogonal to the upper surface and the bottom surface of the molded body 10 of the surface mount inductor 200, an angle formed between a straight line along the surface, which faces the mounting surface, of the first metal plate portion embedded in the molded body and a tangent line L that is set on the side of the surface of the second metal plate portion facing the side surface of the molded body. The tangent line L is a tangent line at a point P where an extension portion, in a direction of the second metal plate portion, of a surface which divides a distance into two equal parts between the surface of the first metal plate portion facing the bottom surface of the molded body and the bottom surface of the molded body and the surface of the second metal plate portion which faces the side surface of the molded body intersects. Here, when the recessed portion for housing the second metal plate portion is provided on the bottom surface of the molded body, a bottom surface of the recessed portion is regarded as the bottom surface of the molded body. In FIG. 2B, since the second metal plate portion has the straight portion and the point P is present in the straight portion, the tangent line L is set along the straight portion. In addition, the interior angle "a" can also be obtained, in a cross section of the surface mount inductor 200, as a sum of an interior angle formed between the straight line along the surface, which faces the mounting surface, of the first metal plate portion embedded in the molded body and the side surface of the molded body, and an interior angle formed between the tangent line L that is set on the side of the surface of the second metal plate portion facing the side surface of the molded body and the side surface of the molded body or an extension line therealong.

Third Embodiment

Figure 3:
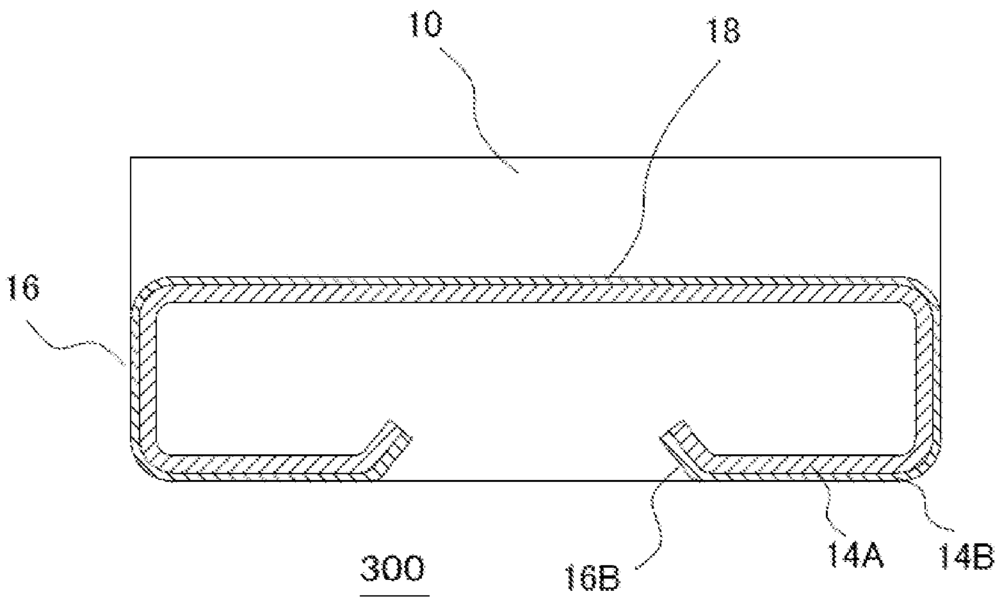
FIG. 3 is a cross-sectional view illustrating example of the surface mount inductor of third embodiment.

A surface mount inductor 300 according to a third embodiment will be described with reference to FIG. 3. FIG. 3 is a schematic cross-sectional view of the surface mount inductor 300, corresponding to FIG. 1B. In the surface mount inductor 300, a part of the second metal plate portion 16 is embedded in the side surface and the bottom surface of the molded body 10 while exposing the surface thereof, and a tip end portion 16B of the metal plate is inserted into an inside direction of the molded body 10.

As illustrated in FIG. 3, the surface mount inductor 300 includes the molded body 10, and the metal plate including the first metal plate portion 18 embedded in the molded body 10 and the second metal plate portion 16 extending from the first metal plate portion 18 to the outside of the molded body. In the surface mount inductor 300, a part of the second metal plate portion 16 is embedded in the side surface and the bottom surface of the molded body 10 while exposing the surface on the opposite side from the surface facing the molded body 10 to the outside of the molded body. Further, the tip end portions 16B of the metal plate are each inserted into the inner direction of the molded body 10. The plating layer 14B is provided on the surface of the second metal plate portion 16 exposed to the outside of the molded body 10. Further, the metal base material 14A of the second metal plate portion 16 is embedded in the molded body 10.

In the surface mount inductor 300, since a part of the second metal plate portion 16 is embedded in the side surface and the bottom surface of the molded body 10 and the tip end portion 16B is inserted into the inside direction of the molded body 10 on the bottom surface of the molded body 10 to form the external terminal, the fixing strength of the external terminal to the molded body 10 is improved. In addition, the solder is more effectively suppressed from entering between the second metal plate portion 16 and the molded body 10 at the time of mounting.

The surface mount inductor 300 is manufactured, for example, by embedding the metal plate bent into a predetermined shape in the molded body 10 while exposing a part of an outer side surface of the second metal plate portion 16, on which the plating layer 14B is provided, to the outer side portion of the molded body 10. Specifically, for example, the manufacture is performed using a manufacturing method that includes preparing the metal plate bent into the predetermined shape, and pressure-molding a portion other than the surface of the second metal plate portion of the prepared metal plate exposed to the outside of the molded body 10 being embedded in the composite material. In the preparing step, for example, by forming the first bent portions by bending the respective end portions of the first metal plate portion 18 of the metal plate on one surface of which the plating layer is provided at an angle of approximately 90° in the same direction with the plating layer facing the outer side portion, by forming the second bent portions by bending the end portions of the portions of the second metal plate portions 16 respectively arranged on the side surfaces of the molded body 10 at an angle of approximately 90° while causing tip ends of the metal plate to face each other in the same direction with the plating layer facing the outer side portion, and by forming third bent portions which are bent toward the first metal plate portion 18 at the end portions of the portions arranged on the bottom surface of the molded body 10, respectively, the metal plate which is bent into the predetermined shape is prepared. In the pressurizing step, while exposing the plating layer which is the outer side surface of the portion of the second metal plate portion 16 which is arranged on the side surface and the bottom surface of the molded body 10, the prepared metal plate is embedded in the composite material and the pressure-molding is performed.

Fourth Embodiment

Figure 4:
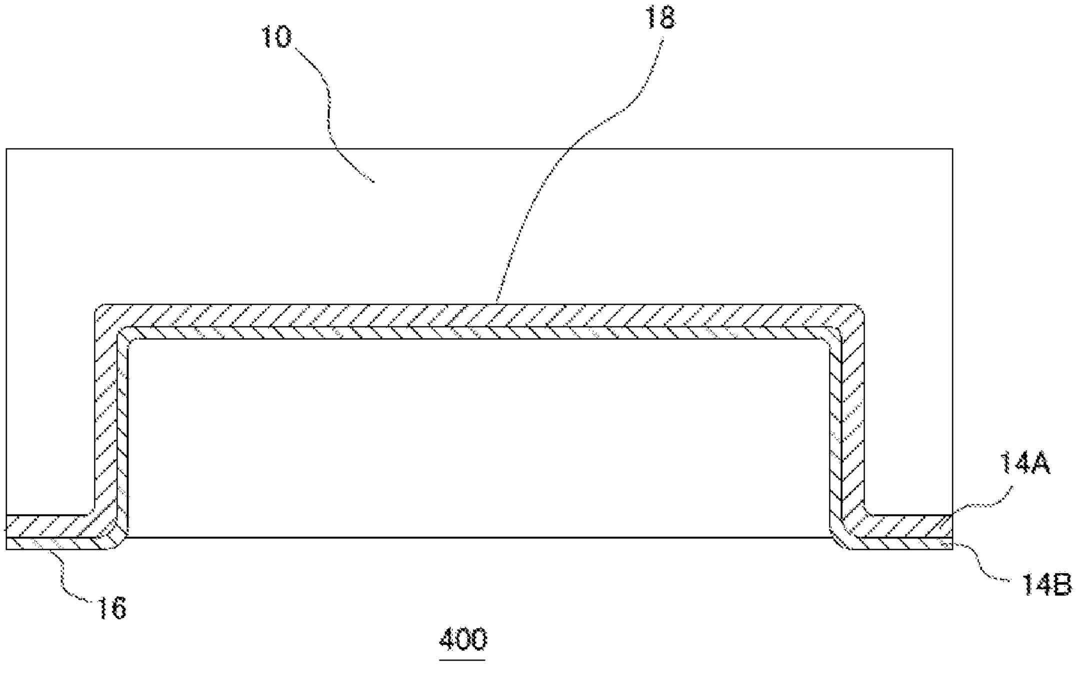
FIG. 4 is a cross-sectional view illustrating example of the surface mount inductor of fourth embodiment.

A surface mount inductor 400 according to a fourth embodiment will be described with reference to FIG. 4. FIG. 4 is a schematic cross-sectional view of the surface mount inductor 400, corresponding to FIG. 1B. In the surface mount inductor 400, the first metal plate portion 18 embedded in the molded body 10 has a portion extending in a direction substantially parallel to the bottom surface and a portion extending in a direction substantially orthogonal to the bottom surface, and constitutes the coil conductor portion. Further, the second metal plate portion 16 is extended from the bottom surface of the molded body 10 to the outer side portion of the molded body 10, and is arranged along the bottom surface of the molded body 10 with a bent portion.

As illustrated in FIG. 4, the surface mount inductor 400 includes the molded body 10, and the metal plate including the first metal plate portion 18 embedded in the molded body 10 and the second metal plate portion 16 extending from the first metal plate portion 18 to the outside of the molded body. In the surface mount inductor 400, the second metal plate portion 16 is extended from the bottom surface of the molded body 10, and is arranged along the bottom surface to constitute the external terminal. The second metal plate portion 16 is embedded in the bottom surface of the molded body 10 by exposing the surface on the opposite side from the surface facing the molded body 10 from the molded body 10. The plating layer 14B is provided on the surface of the second metal plate portion 16 exposed on the bottom surface of the molded body 10. Further, the metal base material 14A of the second metal plate portion 16 is embedded in the bottom surface portion of the molded body 10.

In the first metal plate portion 18 embedded in the molded body 10, a portion arranged in parallel to the bottom surface of the molded body 10 and a portion arranged in a direction orthogonal to the bottom surface are continuous with the first bent portion interposed therebetween. In FIG. 4, the end surface of the tip end portion of the second metal plate portion 16 is exposed to the side surface of the molded body 10, but the end surface may be embedded in the side surface portion of the molded body 10 without being exposed to the side surface of the molded body 10.

In the surface mount inductor 400, since the plating layer 14B is not present between the surface of the molded body 10 and the second metal plate portion 16 extended from the molded body 10, it is possible to suppress the solder from being absorbed between the external terminal and the molded body. In addition, in the surface mount inductor 400, since the second metal plate portion is partially embedded in the molded body 10, the fixing strength of the external terminal to the molded body is further improved. In addition, in the surface mount inductor 400, since the plating layer 14B is arranged on one surface the first metal plate portion 18 embedded in the molded body 10, the surface mount inductor 400 can be constituted using the metal plate plated on one surface in advance, and thus it is possible to prevent the plating liquid from adhering to the molded body 10. In addition, in the surface mount inductor 400, since the second metal plate portion 16 does not extend to the side surface of the molded body 10, formation of a solder fillet at the time of mounting is suppressed, and thus mounting at a higher density can be achieved.

Fifth Embodiment

Figure 5:
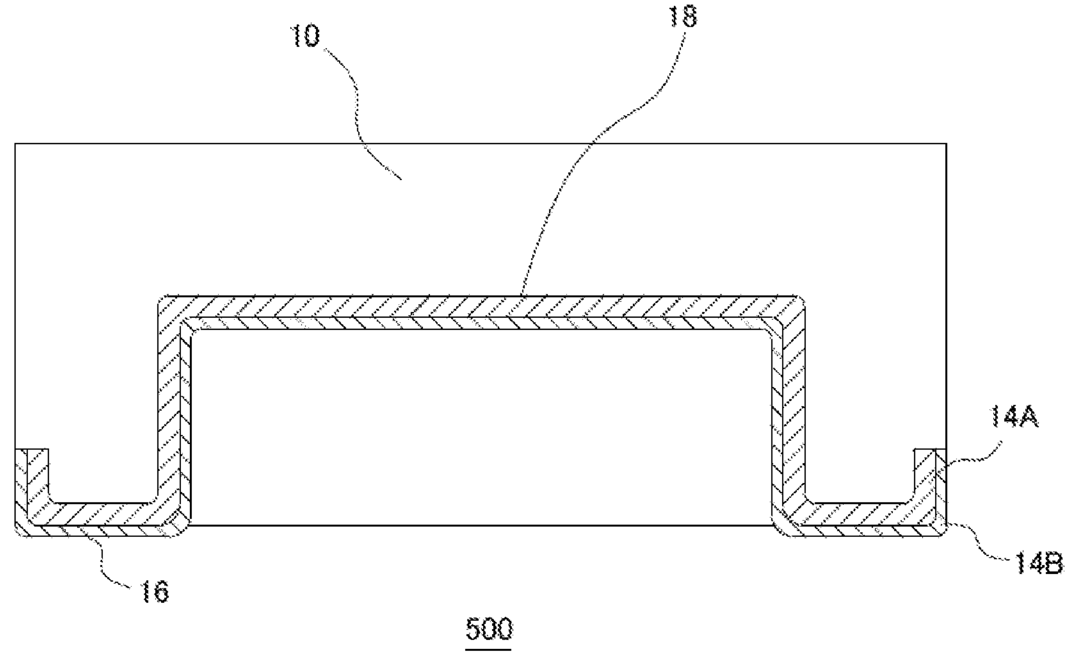
FIG. 5 is a cross-sectional view illustrating example of the surface mount inductor of fifth embodiment.

A surface mount inductor 500 according to a fifth embodiment will be described with reference to FIG. 5. FIG. 5 is a schematic cross-sectional view of the surface mount inductor 500, corresponding to FIG. 1B. In the surface mount inductor 500, as compared with the surface mount inductor 400 according to the fourth embodiment, the second metal plate portion 16 has a portion which is arranged along the side surface of the molded body 10.

As illustrated in FIG. 5, the surface mount inductor 500 includes the molded body 10, and the metal plate including the first metal plate portion 18 embedded in the molded body 10 and the second metal plate portion 16 extending from the first metal plate portion 18 to the outside of the molded body. In the surface mount inductor 500, the second metal plate portion 16 is extended from the bottom surface of the molded body 10, and is arranged along the bottom surface and a part of the side surface of the molded body 10 to constitute the external terminal. The second metal plate portion 16 is embedded in the bottom surface of the molded body 10 by exposing the surface on the opposite side from the surface facing the molded body 10 from the molded body 10. The plating layer 14B is provided on the surface of the second metal plate portion 16 exposed on the bottom surface of the molded body 10. Further, the metal base material 14A of the second metal plate portion 16 is embedded in the molded body 10.

In the surface mount inductor 500, since the second metal plate portion 16 extends to the part of the side surface of the molded body 10 and is arranged, the fixing strength of the external terminal to the molded body is further improved. Further, in the surface mount inductor 500, since the external terminal is provided on the side surface of the molded body 10, a mounting strength to a substrate is further improved.

Sixth Embodiment

Figure 6:
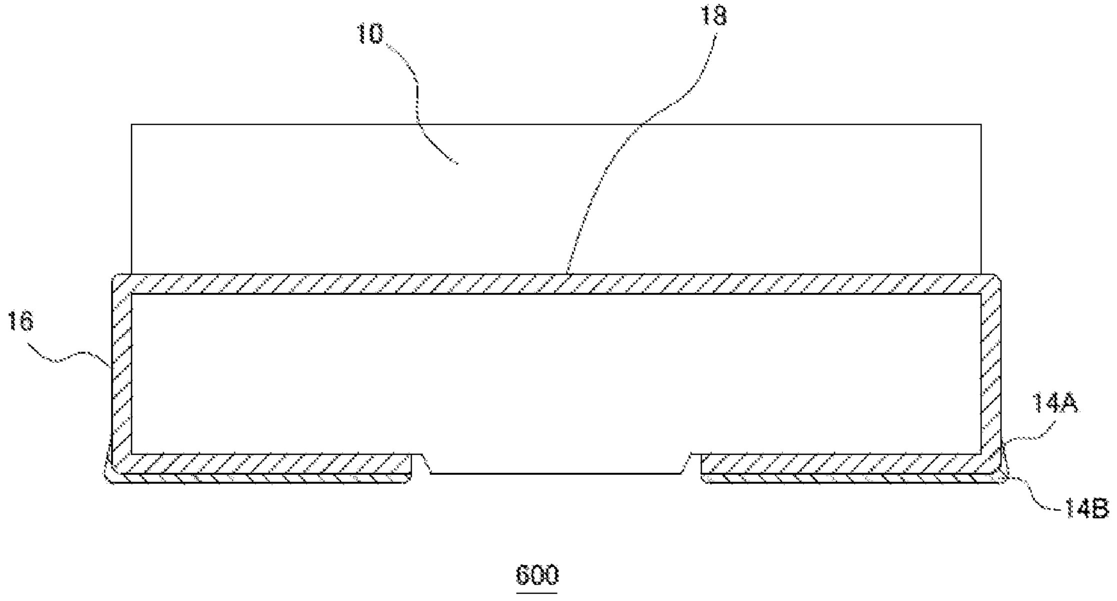
FIG. 6 is a cross-sectional view illustrating example of the surface mount inductor of sixth embodiment.

A surface mount inductor 600 according to a sixth embodiment will be described with reference to FIG. 6. FIG. 6 is a schematic cross-sectional view of the surface mount inductor 600, corresponding to FIG. 1B. In the surface mount inductor 600, as compared with the surface mount inductor 100 according to the first embodiment, the plating layer is arranged on the surface of the second metal plate portion 16 on the opposite side from the surface facing the molded body 10, and is not arranged on the first metal plate portion 18.

As illustrated in FIG. 6, the surface mount inductor 600 includes the molded body 10, and the metal plate including the first metal plate portion 18 embedded in the molded body 10 and the second metal plate portion 16 extending from the first metal plate portion 18 to the outside of the molded body. In the surface mount inductor 600, the first metal plate portion 18 is constituted of the metal base material 14A. In addition, the second metal plate portion 16 is extended from the side surface of the molded body 10, and is arranged along the side surface and the bottom surface of the molded body 10 to constitute the external terminal. The plating layer 14B is provided on the surface on the opposite side from the surface facing the molded body 10 of the portion of the second metal plate portion 16 arranged along the bottom surface of the molded body 10. In FIG. 6, although the plating layer 14B is provided on a part of the portion of the second metal plate portion 16 that is arranged along the side surface of the molded body 10, the plating layer 14B may be provided over the entire portion that is arranged along the side surface of the molded body 10.

In the surface mount inductor 600, since the plating layer 14B is provided in a partial region of the second metal plate portion 16, it is possible to reduce the cost of a plating process. The surface mount inductor 600 can be manufactured, for example, in the same manner as the surface mount inductor 100 according to the first embodiment, except that the metal plate made of the metal base material which does not include the plating layer is used, after forming the bent portion in the second metal plate portion 16, by applying the plating liquid on the surface of the second metal plate portion 16 on the opposite side from the surface facing the molded body 10.

Seventh Embodiment

Figure 7:
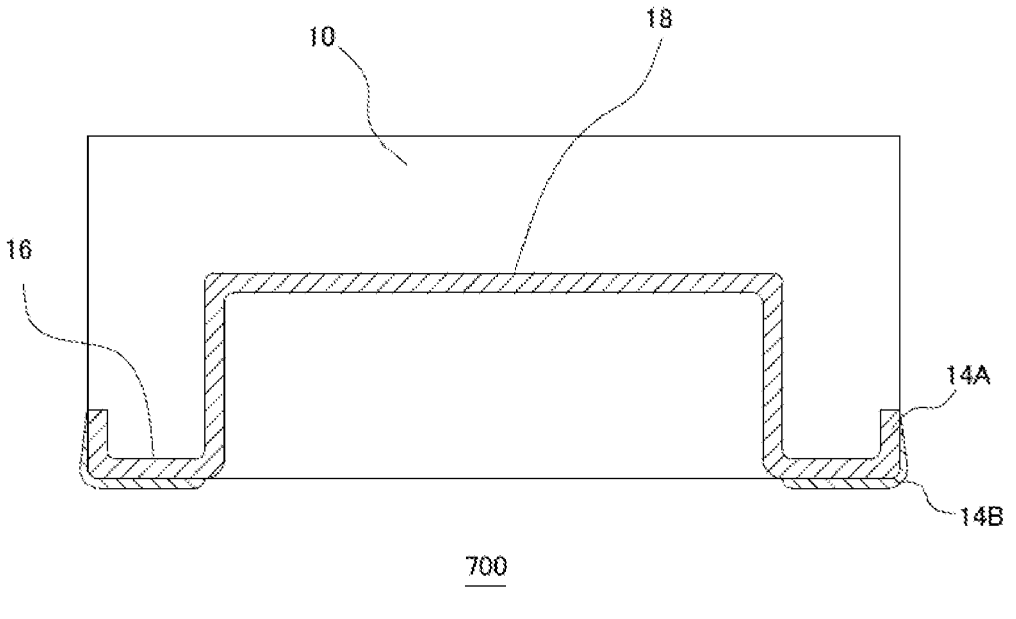
FIG. 7 is a cross-sectional view illustrating example of the surface mount inductor of seventh embodiment.

A surface mount inductor 700 according to a seventh embodiment will be described with reference to FIG. 7. FIG. 7 is a schematic cross-sectional view of the surface mount inductor 700, corresponding to FIG. 1B. In the surface mount inductor 700, as compared with the surface mount inductor 500 according to the fifth embodiment, the plating layer is arranged on the surface of the second metal plate portion 16 on the opposite side from the surface facing the molded body 10, and is not arranged on the first metal plate portion 18.

As illustrated in FIG. 7, the surface mount inductor 700 includes the molded body 10, and the metal plate including the first metal plate portion 18 embedded in the molded body 10 and the second metal plate portion 16 extending from the first metal plate portion 18 to the outside of the molded body. In the surface mount inductor 700, the first metal plate portion 18 is constituted of the metal base material 14A. In addition, the second metal plate portion 16 is extended from the bottom surface of the molded body 10, and is arranged along the bottom surface and a part of the side surface of the molded body 10 to constitute the external terminal. The plating layer 14B is provided on the surface on the opposite side from the surface facing the molded body 10 of the portion of the second metal plate portion 16 arranged along the bottom surface of the molded body 10. In FIG. 7, although the plating layer 14B is also provided on the portion of the second metal plate portion 16 that is arranged along the side surface of the molded body 10, the plating layer 14B may not be provided on the portion that is arranged along the side surface of the molded body 10.

In the surface mount inductor 700, since the plating layer 14B is not provided on the first metal plate portion 18, it is possible to reduce the cost of the plating process.

In the surface mount inductor described above, although the first metal plate portion forms the coil conductor with a substantially straight line shape, the first metal plate portion may have a substantially coil shape bending in the width direction or a substantially coil shape bending in the thickness direction. In addition, without providing the recessed portion for housing the second metal plate portion on the bottom surface of the molded body, the tip end portion of the second metal plate portion may be arranged on the bottom surface of a substantially plane shape. Further, the width of the second metal plate portion may be formed larger than the width of the first metal plate portion, and may be equal to or smaller than the width of the molded body.

Further, the size of the molded body and the size of the metal plate can be changed as appropriate in accordance with characteristics of the inductor.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A surface mount inductor comprising:

a molded body made of a composite material containing magnetic powder; and a metal plate including a first metal plate portion embedded in the molded body and a second metal plate portion extending from the first metal plate portion to an outside of the molded body, wherein the second metal plate portion is extended from a side surface or mounting surface side of the molded body, is arranged along the molded body with a bent portion, and forms an external terminal arranged at least on the mounting surface side of the molded body, the external terminal includes a plating layer on a surface on an opposite side from a surface facing the molded body, and does not include any plating layer on the entire surface facing the molded body, the first metal plate portion constitutes a coil conductor, and the plating layer is provided on both the coil conductor and the external terminal.

2. The surface mount inductor according to claim 1, wherein the first metal plate portion includes the plating layer on a surface which is continuous with the surface of the external terminal including the plating layer.

3. The surface mount inductor according to claim 1, wherein the molded body includes a recessed portion for housing the external terminal on the mounting surface side.

4. The surface mount inductor according to claim 1, wherein the second metal plate portion is extended from the side surface of the molded body.

5. The surface mount inductor according to claim 1, wherein the second metal plate portion is extended from the mounting surface side of the molded body.

6. The surface mount inductor according to claim 1, wherein at least a part of a surface of the second metal plate portion facing the molded body is embedded in the molded body.

7. The surface mount inductor according to claim 1, wherein the plating layer includes a nickel plating layer and a tin plating layer arranged on the nickel plating layer.

8. The surface mount inductor according to claim 2, wherein the molded body includes a recessed portion for housing the external terminal on the mounting surface side.

9. The surface mount inductor according to claim 2, wherein the second metal plate portion is extended from the side surface of the molded body.

10. The surface mount inductor according to claim 3, wherein the second metal plate portion is extended from the side surface of the molded body.

11. The surface mount inductor according to claim 2, wherein the second metal plate portion is extended from the mounting surface side of the molded body.

12. The surface mount inductor according to claim 3, wherein the second metal plate portion is extended from the mounting surface side of the molded body.

13. The surface mount inductor according to claim 2, wherein at least a part of a surface of the second metal plate portion facing the molded body is embedded in the molded body.

14. The surface mount inductor according to claim 3, wherein at least a part of a surface of the second metal plate portion facing the molded body is embedded in the molded body.

15. The surface mount inductor according to claim 4, wherein at least a part of a surface of the second metal plate portion facing the molded body is embedded in the molded body.

16. The surface mount inductor according to claim 5, wherein at least a part of a surface of the second metal plate portion facing the molded body is embedded in the molded body.

17. The surface mount inductor according to claim 2, wherein the plating layer includes a nickel plating layer and a tin plating layer arranged on the nickel plating layer.

18. The surface mount inductor according to claim 3, wherein the plating layer includes a nickel plating layer and a tin plating layer arranged on the nickel plating layer.

19. The surface mount inductor according to claim 4, wherein the plating layer includes a nickel plating layer and a tin plating layer arranged on the nickel plating layer.

20. The surface mount inductor according to claim 5, wherein the plating layer includes a nickel plating layer and a tin plating layer arranged on the nickel plating layer.

* * * * *